United States Patent
Honkanen et al.

(10) Patent No.: US 6,797,125 B2
(45) Date of Patent: Sep. 28, 2004

(54) METHOD OF TREATING CONDENSATES

(75) Inventors: Risto Honkanen, Espoo (FI); Jan E Öhman, Helsinki (FI)

(73) Assignee: Andritz Oy, Helsinki (FI)

( * ) Notice: Subject to any disclaimer, the term of this patent is extended or adjusted under 35 U.S.C. 154(b) by 0 days.

(21) Appl. No.: 10/289,461

(22) Filed: Nov. 7, 2002

(65) Prior Publication Data

US 2003/0089593 A1 May 15, 2003

(30) Foreign Application Priority Data

Nov. 9, 2001 (FI) .............................................. 20012170

(51) Int. Cl.⁷ .............................. B01D 1/26; B01D 3/06; B01D 5/00
(52) U.S. Cl. ........................ 203/71; 159/2.1; 159/17.3; 159/47.3; 159/DIG. 8; 162/30.11; 162/47; 162/63; 202/174; 202/202; 203/80; 203/87; 203/88
(58) Field of Search ................................ 159/2.1, 17.1, 159/17.3, DIG. 8, 47.3, 47.1; 203/88, 71, 78, 80, 87; 202/174, 202, 179; 162/47, 63, 30.11, 15–17

(56) References Cited

U.S. PATENT DOCUMENTS

| | | | | |
|---|---|---|---|---|
| 2,796,120 A | * | 6/1957 | Jenssen et al. | 159/47.3 |
| 3,179,159 A | * | 4/1965 | Jafs | 159/47.3 |
| 4,155,804 A | * | 5/1979 | Edge, Jr. | 162/16 |
| 4,274,911 A | * | 6/1981 | Kroneld et al. | 162/15 |
| 5,277,759 A | * | 1/1994 | Sannholm | 162/16 |
| 5,830,314 A | | 11/1998 | Mattsson | |
| 6,258,206 B1 | * | 7/2001 | Olausson et al. | 159/47.3 |
| 6,261,412 B1 | * | 7/2001 | Ryham | 162/17 |
| 6,383,342 B1 | * | 5/2002 | Ohman | 203/49 |

* cited by examiner

Primary Examiner—Virginia Manoharan
(74) Attorney, Agent, or Firm—Nixon & Vanderhye P.C.

(57) ABSTRACT

The present invention relates to a method of treating condensates containing compounds, which are more volatile than water, in an evaporation plant, where liquid, such as effluent liquid from a pulp or paper mill is evaporated in multiple effects and where condensates generated in the evaporation are flashed and purified in a steam stripping column. In the method, the condensates from at least two evaporation effects are combined and flashed together, and the vapor obtained from the flashing is made to contact with a condensate stream to be purified in the stripping column, wherefrom the impurities-containing vapor and the purified condensate stream are discharged.

10 Claims, 2 Drawing Sheets

METHOD OF TREATING CONDENSATES

Figure 1:
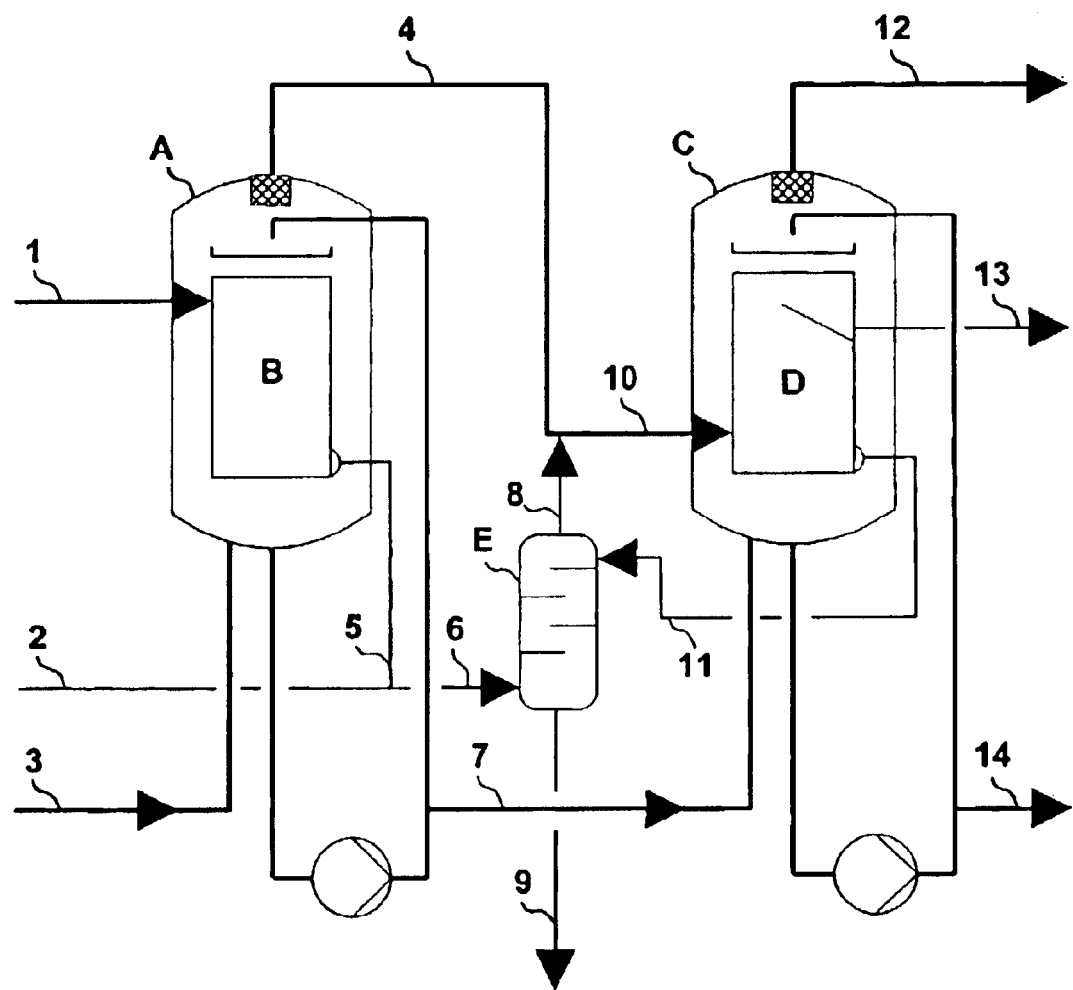

The present invention relates to the treatment of evaporator condensates containing compounds, which are more volatile than water. In the method, the condensate is put into contact with vapor, whereby impurities contained in the condensate are transferred to the vapor stream. The method is referred to as stripping. According to the present invention, vapor generated in the flashing of evaporator condensates is used as stripping steam. The invention relates to evaporation plants, wherein the liquid to be evaporated, such as black liquor and effluent water, contains compounds which are more volatile than water.

The inorganic compounds of black liquor generated in cooking are recovered from the black liquor and the organic part is used as fuel. For the recovery, the black liquor is evaporated to a high dry solids content (70–85%) in a multieffect evaporation plant. Most typically the evaporation plant is operated so that the vapor produced in an evaporation effect operating at the highest pressure is used to heat an evaporation effect having the next highest pressure, while the liquor flows countercurrently in respect to the heating vapor. Typically the evaporation plant has 5–7 effects. An evaporation effect comprises one or more evaporation units using one and the same heating vapor supply.

In sulfate cooking of cellulose pulp, malodorous sulfur compounds are generated, such as methylmercaptan, dimethylsulfide and dimethyldisulfide, as the sulfide and hydrogen sulfide ions react with lignin or the methoxyl groups of lignin fragments. The cooking also releases abundantly of methanol. Vapors containing sulfur compounds and methanol are abundantly released e.g. in the evaporation of black liquor, in which said compounds are distilled and condensed into condensates of a multieffect evaporation plant. Methanol is the most significant of the volatile components of black liquor condensates, as it is the major source of the COD-value (COD—chemical oxygen demand) of the condensates due to its high concentration. Due to environmental requirements and in order to increase the reuse value of the condensates, methanol is removed from the condensates.

The aim is to treat condensates in such a way that said volatile components can be made to be concentrated into a small amount of foul condensate, which is usually purified by steam stripping. The condensates may be divided into a pure condensate and a condensate to be purified, e.g. by means of a certain construction of the heat transfer elements of the evaporation plant. U.S. Pat. No. 4,878,535 discloses one construction of this kind. The volume of foul condensate may vary freely within certain limits set by the design of the element, depending on the operator's requirements for the purity of the pure condensate. Normally the amount is 10–20% of the total condensate volume of the evaporation plant.

Reuse of the heat of the secondary condensate is important for the heat economy of the mill. For that purpose, condensates coming from each evaporation effect are usually flashed in the steam flow direction to a next effect, in which the heat of the flash vapor is utilized. The flashing also reduces the amount of volatile impurities in the condensate.

Foul condensate is most usually purified by steam stripping. Usually a stripping column for foul condensate is integrated to the evaporation plant for minimizing the heat consumption of the stripping. The steam used for the stripping is either vapor generated in evaporation or vapor produced of stripped condensate in a reboiler by means of fresh steam. When the stripper for foul condensate is located between the first and second evaporation effects, the impurities-containing vapor exiting the stripper is led as heating steam to the second effect, into the black liquor preheater or both. The remaining stripper gases are led via a trim-condenser to combustion or methanol liquefaction.

A common goal for mills, such as pulp and paper mills, is an increasingly higher degree of closure of processes in order to reduce the amount of effluents released to the environment. A closed water circulation results in concentration of impurities, which may cause disturbances in the processes in the mill. That is why e.g. the condensates must be purified as required prior to reusing them e.g. as process water. The increase in volume of condensates to be purified requires larger stripping columns and larger steam volumes, thus decreasing e.g. the energy economics of the mill. The object of the present invention is to minimize these problems and to provide for a method, which in a simple and economical way reduces the volume of foul condensate generated in an evaporation plant and thus reduces the need for condensate purification. The method according to the invention provides for an essentially odorless, pure condensate that may be used in a production plant without additional purification instead of raw water.

The present invention relates to a method of treating condensates in an evaporation plant, in which e.g. an effluent liquid of a pulp or paper mill is evaporated in multiple effects and condensates generated in the evaporation are purified. A characteristic feature of the method is that unflashed condensates from at least two effects are combined and flashed together and that vapor obtained from the flashing is made to contact with a condensate stream to be purified in a stripping column, wherefrom the impurities-containing vapor and the purified condensate stream are discharged. In the following, the stripping column according to the invention is referred to as a flash vapor stripper.

Evaporator condensates are usually flashed between the evaporation effects, and the vapor generated therein is used for evaporation in a following effect. In the coupling according to the invention, condensates are not flashed between each effect separately, but before flashing condensates are combined and the thus combined condensates are flashed at a desired location, and the flash vapor is led into a lower part of the flash vapor stripper. This provides for an adequate amount of vapor for the stripping. The condensates led to the flashing must be cleaner than the condensate to be purified, in order to obtain the desired purification efficiency in the flash vapor stripper. For example, in a six-effect evaporation plant, where the stripper according to the invention is located between the fourth and fifth evaporation effects, the volume of vapor generated in the flashing of pure condensates is about 15% of the volume of condensate to be purified and led into the flash vapor stripper.

The flashing releases volatile impurities from the condensate into the flash vapor. Thus, the flashed condensate is in most cases without further treatment adequately pure to be used as process water. Subsequently, the flashed condensate and the condensate stripped in the flash vapor stripper may be combined for further use. If it is desired to combine the flashed condensate and the stripped condensate, the flashing may be performed at the bottom part of the flash vapor stripper, whereby a separate flashing vessel is not needed. In such a case, the evaporator condensate obtained from previous evaporation effects is led into a lower part of the flash vapor stripper, where a pressure decrease generates vapor to be used as stripping vapor.

From the bottom of the stripping column, the flash vapor travels through mass transfer trays or packings to the upper part of the column, wherefrom the vapor is led into a following evaporation effect. The most preferred location for the flashing and the flash vapor stripper is prior to the evaporation unit wherefrom the condensate to be stripped is fed into the stripper column. Thus, the condensate to be stripped is at a saturated temperature corresponding to the pressure in the stripper, and no stripping vapor is consumed for heating the condensate. If the amount of stripping vapor is 15% of the amount of the condensate to be purified, about 75% of the methanol contained in the condensate to be purified can be separated at a pressure of 40 kPa. In view of heat economy, it is preferred to lead the foul vapor obtained from the top of the flash vapor stripper to be used as heating vapor in an evaporation effect subsequent to the stripper. The evaporation unit, wherein the stripper vapor is led, must be provided with either a segregation of condensates into a pure and a foul condensate or a significant venting in order to prevent the condensate obtained from said unit from fouling caused by the stripper vapor. The stripper vapor may also be led into a separate vapor part in the evaporation unit or into a separate condenser, whereby the foul vapor obtained from the top of the stripper may be condensed into a fraction of its own and purified e.g. in a stripper for foul condensate.

In the following, the invention is described with reference to the appended FIGS. 1 and 2, which illustrate some preferred embodiments of the invention.

FIG. 1 illustrates two subsequent effects A and C of a multieffect evaporation plant, which effects are provided with heat transfer elements B and D. Except for the lamellas illustrated in FIG. 1, the heat transfer elements may be e.g. tubes.

Secondary vapor is introduced into effect A from a previous evaporation effect via line 1, which secondary vapor is condensed in heat transfer elements B. The generated condensate in line 5 together with a condensate collected from a previous effect or previous effects is led via line 6 into a stripping column E positioned between evaporation effects A and C. In this embodiment, it is desired to combine the flashed condensate and the stripped condensate, and for that reason the flashing is performed in the lower part of the flash vapor stripper E. The evaporator condensate 6 obtained from previous evaporation effects is led into a lower part of the stripping column E, where pressure decrease generates vapor.

The vapor passes via a mass transfer portion to the top of the column E, wherefrom the vapor is led via line 8 into a heat transfer portion D of the following effect C. The condensate to be purified 11 from the evaporation effect C is led into the upper part of the column E, wherefrom the condensate flows through the mass transfer portion to the bottom of the column. The flashed condensate and the purified condensate are mixed in the lower part of the column, and the combined condensate is led out from the bottom of the column via line 9.

The inside of the heat transfer element D of effect C is provided with an intermediate wall, as disclosed e.g. in U.S. Pat. No. 4,878,535. Accordingly, the segregation into pure and foul condensate may be effected by means of an intermediate wall in a tube evaporator. Flash vapor 8 is led into the heat transfer element D via line 10 and secondary vapor generated in effect A via line 4. The inner part of the heat transfer lamella, into which secondary vapor is fed as heating medium, is divided by means of an inclined intermediate wall into an upper and a lower compartment. The vapor is fed into the lower compartment of the element, wherein more easily condensed components are condensed, such as water vapor. The condensate formed in this compartment is relatively pure water, though containing some methanol, and it is led for purification into the flash vapor stripper E as described above. From the lower compartment, the vapor flows further to the upper compartment, the location of the vapor flow having a higher percentage of volatile impurities, whereby foul condensate 13 is generated, which foul condensate requires purification and is led into a stripper for foul condensate (not shown).

The liquid to be evaporated flows in lines 3, 7 and 14.

Figure 2:
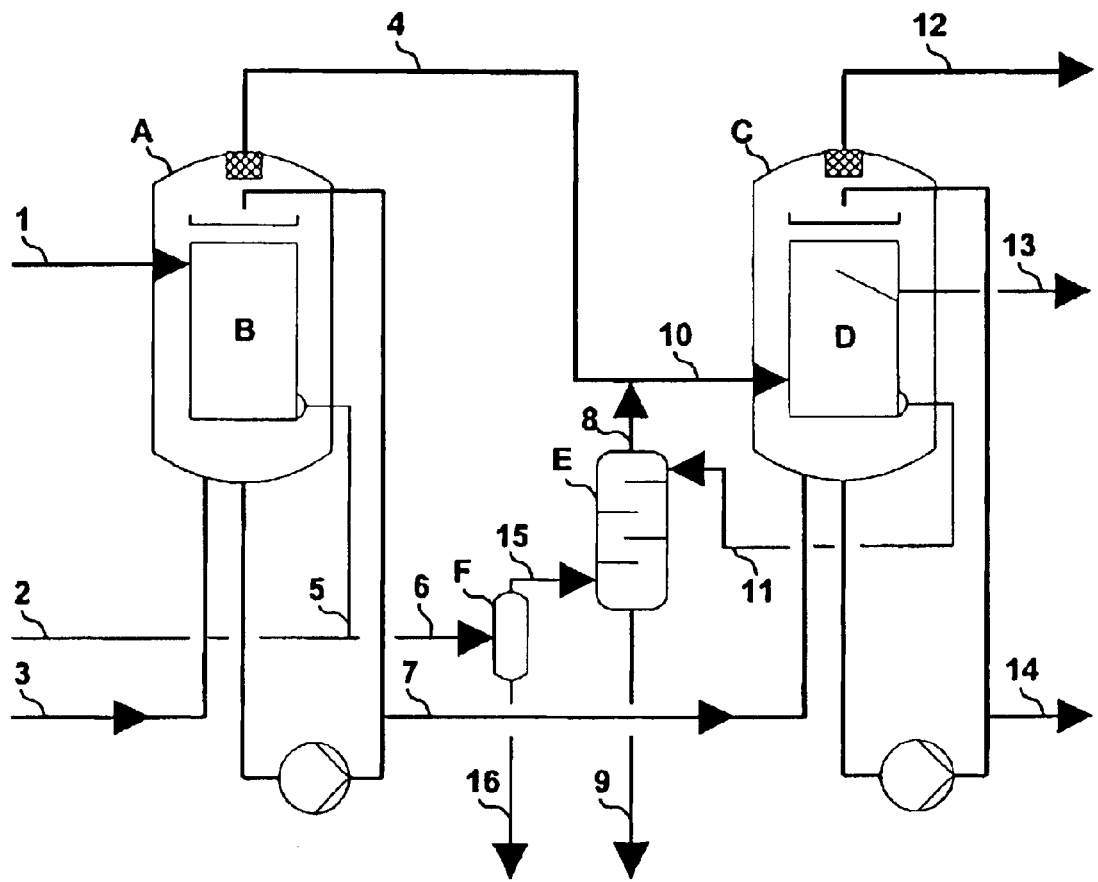

In the embodiment of FIG. 2, the flashing of the condensate is effected in a separate flashing vessel F for keeping the flashed condensate and the stripped condensate apart. Where appropriate, the reference numerals in FIG. 2 are the same as in FIG. 1.

The evaporator condensate in line 6, obtained from preceding evaporation effects, is led into a separate flashing vessel F connected to the flash vapor stripper E by means of a steam line 15. The flash vapor is led via line 15 to the lower part of the stripping column E, wherefrom the vapor passes through a mass transfer portion to the top of the column and further to a heat transfer part D of the following effect C. The condensate 11 to be purified from the evaporation effect C is led to the upper part of the column E, wherefrom the condensate flows through the mass transfer portion to the bottom of the column. The flashed condensate 16 and the purified condensate 9 are led out in separate lines.

As the secondary condensates are flashed combined, the steam economy, i.e. amount of water evaporated per unit amount of steam used is lower in the coupling according to the present invention than in a corresponding mill, where the secondary condensate is flashed between each evaporation effect. The decrease in the steam economy is relatively small, though. In a six-effect evaporation plant, when the stripper is located between the fourth and fifth effects, the steam economy in a coupling according to the invention is about 1,5% lower than in a corresponding plant, where the secondary condensates are flashed between each evaporation effect.

By means of the coupling according to the invention, the volume of foul condensate from the evaporation plant can be decreased. If the evaporator condensates are segregated into three fractions—pure, medium pure and foul condensate— the volume of foul condensate in the coupling according to the invention is about 25% smaller than in a coupling, where the pure secondary condensate is flashed separately between each effect, the methanol recovery to foul condensate and the methanol content of pure condensate being the same in both cases. The term "methanol recovery to foul condensate" is used to refer to the ratio of the methanol volume of foul condensate to the methanol volume of liquor fed into the evaporator plant. Vapor consumption in the stripper for foul condensate decreases almost proportionally to the decrease in the amount of foul condensate obtained from the evaporation plant. As the amount of foul condensate and vapor required for the stripping decreases, the size of the stripping column to be used in the purification of foul condensate may be reduced remarkably. The method according to the invention is profitable, as the saving caused by a smaller stripper for foul condensate and non-existent flashing vessels is greater than the extra cost caused by a small flash vapor stripper.

When utilizing the coupling of FIG. 1, in which the flashed condensate and the stripped secondary condensate are combined, the amount of pure condensate obtained from the forward end of the evaporator series may be increased. In the coupling according to the invention, the amount of pure secondary condensate is up to 30% greater than in a corresponding 6-effect evaporator plant, where the secondary condensate is flashed separately between each evaporation effect, while the methanol content of the secondary condensate is the same in both cases.

Although only a few preferred embodiments of the method according to the invention are disclosed in the above, the invention covers all different modifications and variations within the scope of the invention determined by the appended claims.

What is claimed is:

1. Method of treating condensates containing compounds which are more volatile than water, which method comprises evaporating in multiple effects in an evaporation plant an effluent liquid to form a condensate stream to be purified having compounds which are more volatile than water; and purifying the condensate stream to be purified, wherein said evaporating step includes (a) combining unflashed condensates from at least two evaporation effects in the evaporation plant, and (b) flashing together said combined unflashed condensates, and wherein said step of purifying the condensate stream to be purified comprises stripping the impurities from the condensate stream to be purified by bringing vapor obtained from the flashing step (b) into contact with the condensate stream to be purified in a stripping column to thereby obtain an impurities-containing vapor and a purified condensate stream as discharge streams from the stripping column.

2. A method according to claim 1, wherein the condensate stream to be purified in the stripping column originates from an effect following said at least two evaporation effects, and wherein said effect which follows said at least two evaporation effects has a lower steam pressure than said at least two evaporation effects.

3. A method according to claim 1, wherein the impurities-containing vapor discharged from the stripping column is condensed in the multiple effects, wherefrom the condensate stream to be purified is obtained.

4. A method according to claim 1, wherein the flashing and the stripping steps are performed in separate vessels so that the flashing step is performed in a flashing vessel prior to the stripping column.

5. A method according to claim 4, wherein the flashed condensate stream is discharged from the flashing vessel and used as process water.

6. A method according to claim 1, wherein the flashing step is performed at a bottom part of the stripping column, and wherein the condensate stream to be purified is led into the upper part of the stripping column, wherein the condensate flows downwards and contacts the flash vapor and wherein the flashed condensate and the stripped condensate are discharged together from the bottom part of the stripping column.

7. A method according to claim 1, wherein the vapor originating from the stripping column is condensed in an evaporation effect, and wherein venting is performed in such a way that the condensate is essentially unfouled by the impurities in the stripping column vapor.

8. A method according to claim 1, wherein the impurities-containing vapor from the stripping column is condensed in a separate condenser.

9. A method according to claim 1, wherein the impurities-containing vapor from the stripping column is condensed into a first and a second partial condensate flow, of which the first flow has a greater volume and is purified with flash vapor in the stripping column, and wherein the second flow has smaller volume and contains most of the impurities, said second flow being purified in a foul condensate stripping column.

10. A method according to claim 1, wherein the effluent liquid is effluent liquid of a pulp or paper mill.

* * * * *